2,934,440
PROCESS FOR THE PRESERVATION OF WHALE MEAT

Roland Gordon Booth, St. Albans, England

No Drawing. Application December 3, 1958
Serial No. 777,839

Claims priority, application Great Britain June 25, 1954

9 Claims. (Cl. 99—158)

This invention is concerned with the preservation of meat obtained from mammals and primarily, though not exclusively, with the preservation of whalemeat. The present application is a continuation-in-part of my co-pending application Serial No. 518,408, filed June 27, 1955, now abandoned.

At the present time fresh whalemeat is usually preserved by freezing in refrigerated ships which have to be sent out to the whaling grounds in the Antarctic. This adds considerably to the cost of the whalemeat.

It has now been found that whalemeat can be preserved satisfactorily without freezing and much more cheaply if after cutting up and cooling to ambient temperatures, i.e. to a temperature of about 15° C. or below it is treated with formic acid, so that the pH of the meat is reduced to 4.75 or lower. The resultant meat remains in good condition for many months and is quite suitable for use inter alia in animal food products.

Since it is essential that the formic acid should penetrate the meat, the process should not be carried out below the temperature at which the meat freezes. Under normal circumstances, meat will freeze at about 2° C. to an extent which seriously impairs the penetration of a treating solution.

It has further been found that this preservation treatment can be used with similar good results for knacker meats and for beef, pork and mutton.

The invention thus consists in a process for the preservation of mammalian meat in which the meat after cutting up and cooling to a temperature of about 15° C. or below is treated with formic acid, to reduce its pH value to 4.75 or less. The temperature should not be below that at which the meat freezes, that is, in normal circumstances, not below about 2° C. Preferably, suitable proportions of ascorbic acid and an alkali nitrite are used in conjunction with the formic acid as these substances help to maintain, and may even enhance, the keeping quality and good appearance of the meat.

The process of the invention may suitably be carried out by treating the meat with an aqueous solution containing in solution formic acid, ascorbic acid and an alkali nitrite e.g. sodium nitrite.

Thus a solution containing from 30 to 75 gms. of formic acid
0.5 to 1.0 gms. of ascorbic acid, and
7 to 20 gms. of sodium nitrite per litre has been found to be very effective.

The temperature to which the meat is cooled before being treated with formic acid will normally be in the region of the ambient temperature, i.e. a temperature that can be attained without the use of special refrigerating equipment. The temperature should not, however, be substantially in excess of 15° C. and cooling to this temperature can be accomplished without difficulty in normal circumstances.

The pH of the meat referred to in this specification and in the claims is determined by finely mincing a sample of the meat, with its appropriate portion of the treating liquor, to form a sludge and determining the pH of the sludge with a glass electrode.

In carrying out the process of the invention the following procedure may be adopted. After slaughtering or killing of the animal, the meat is cut up into thin strips or small pieces of a maximum thickness of about 1 inch or 2.5 centimetres. The pieces of meat are cooled with a blast of cold air or otherwise to 15° C. or below and are then thoroughly mixed with such a quantity of an aqueous solution of formic acid, ascorbic acid and sodium nitrite as to reduce its pH to a value not exceeding 4.75 but preferably somewhat lower. The mixing may take place in a rotating mixer, comprising a rotating, inverted conical drum provided with internal curved vanes, which serve continually to lift the meat close to the top of the drum, the meat then dropping back to the bottom of the drum. After thorough mixing, the progress of which may be observed by the change in colour of the meat, the mixture of meat and solution is charged into storage tanks, drums or barrels, which are then sealed off. To prevent mould growth the upper surface of the charge in each tank, drum or barrel may be sprayed or otherwise covered with a thin layer of a 5% solution of sodium benzoate, or other suitable and permissible mould-inhibiting solution before the container is sealed.

Following is an example of the preservation of whalemeat in accordance with the invention. All percentages quoted therein are by weight.

Example

Whalemeat of average freezing quality was cut up into strips of thickness of from ¾ to 1 inch and ranging from 2 to 8 inches in length and 1 to 3 inches in width and subjected to a blast of cold air until the average temperature of the meat was reduced to 15° C., as shown on a steel cased thermometer immersed in the mass of the meat.

The meat was then charged to a mixer of the kind referred to above together with 14 ccs. of 12% aqueous formic acid
8.6 ccs. of 0.2% aqueous ascorbic acid, and
8.6 ccs. of 5% aqueous solution of sodium nitrite per kilogram of meat.

After thorough mixing for 4 minutes, the mixture was found to have a pH value of 4.60, determined in the manner described above.

The mixture was discharged into wooden barrels. A second mixing was similarly carried out and discharged into steel drums. After covering the top surface in each drum and barrel with a thin layer of a 5% aqueous solution of sodium benzoate, the drums and barrels were fitted with lids and sealed off.

After six months the drums and barrels were opened up and in all cases the meat was found to be in excellent condition and of good appearance. It was suitable for use precisely in the same way as raw meat for various purposes and inter alia in the preparation of animal foods.

It is necessary in the successful preservation of meat by this method that the initial bacterial contamination of the meat should be as low as possible and that it should be prepared for preservation under reasonably hygienic conditions.

What I claim is:

1. A process for the preservation of whale meat which comprises the steps of cutting up the whale meat into small pieces, and thoroughly mixing the cut-up meat, while at a temperature not exceeding about 15° C., but above that at which the meat freezes, with formic acid and thereby reducing its pH value to about 4.6 to 4.75.

2. A process for the preservation of whale meat which comprises the steps of cutting up the whale meat into small pieces, cooling the cut-up meat to temperature of from about 2 to 15° C., and thoroughly mixing the cooled cut-up meat with formic acid and thereby reducing its pH value to about 4.6 to 4.75.

3. A process for the preservation of whale meat which comprises the steps of cutting up the whale meat into small pieces, cooling the cut-up meat to a temperature not exceeding about 15° C. and being above that at which the meat freezes, and thoroughly mixing the cut-up cooled meat with an aqueous solution of formic acid containing from about 30 to 75 grams of formic acid per litre of solution and thereby reducing its pH value to about 4.6 to 4.75.

4. A process as claimed in claim 3, in which said aqueous solution contains, in addition to the formic acid, from about 0.5 to 1.0 gram of ascorbic acid and from about 7 to 20 grams of sodium nitrite per litre of solution.

5. A process for the preservation of whale meat which comprises the steps of cutting up the meat into pieces not exceeding about one inch in thickness, cooling the meat to a temperature which does not exceed about 15° C. and is above that at which the meat freezes, thoroughly mixing the cut-up meat with an aqueous solution containing from about 30 to 75 grams of formic acid per litre of solution, from about 0.5 to 1.0 gram of ascorbic acid per litre of solution, and from about 7 to 20 grams of sodium nitrite per litre of solution, the quantity of said aqueous solution used being sufficient to reduce the pH value of the meat to about 4.6 to 4.75, and charging the thus treated meat together with the treating liquid into a container and sealing the container.

6. A process as claimed in claim 5, in which the charge in the container is covered with a mould inhibiting composition prior to the sealing of the container.

7. A process for the preservation of whale meat which comprises the steps of cutting up the whale meat into small pieces, cooling the cut-up meat to a temperature of about 15° C., thoroughly mixing the thus cut-up cooled meat with formic acid and thereby reducing its pH to about 4.6 to 4.75.

8. A process for the preservation of whale meat which comprises the steps of cutting up the meat into pieces not exceeding about one inch in thickness, cooling the cut-up meat to a temperature of about 15° C., thoroughly mixing the cut-up meat with an aqueous solution containing from about 30 to 75 grams of formic acid, from about 0.5 to 1.0 gram of ascorbic acid, and from about 7 to 20 grams of sodium nitrite per litre of solution, the quantity of said aqueous solution used being sufficient to reduce the pH value of the meat to about 4.6 to 4.75, and charging the thus treated meat together with the treating liquid into a container and sealing the container.

9. A process as claimed in claim 8, in which the charge in the container is covered with a mould inhibiting composition prior to the sealing of the container.

References Cited in the file of this patent

UNITED STATES PATENTS

| | | |
|---|---|---|
| 987,868 | Ellis | Mar. 28, 1911 |
| 1,223,790 | Holzapfel | Apr. 24, 1917 |
| 1,914,121 | Hammersley | June 13, 1933 |
| 2,643,952 | Crowther et al. | June 30, 1953 |

FOREIGN PATENTS

| | | |
|---|---|---|
| 446,065 | Great Britain | Apr. 23, 1936 |
| 455,846 | Great Britain | Oct. 28, 1936 |

OTHER REFERENCES

"Food," April 1949, pp. 114, 115 and 116, article entitled Canning of Whalemeat.

"Nature," Oct. 7, 1950, pp. 613 and 614, article entitled Preservation of Fish by the Use of Nitrite Ice.